July 22, 1924.

R. L. FORD 1,501,944

FERTILIZER ATTACHMENT FOR PLANTERS

Filed Dec. 19, 1919

Inventor:
Ralph L. Ford,
By John P. Smith
Atty.

July 22, 1924.
R. L. FORD
FERTILIZER ATTACHMENT FOR PLANTERS
Filed Dec. 19, 1919     2 Sheets-Sheet 2
1,501,944
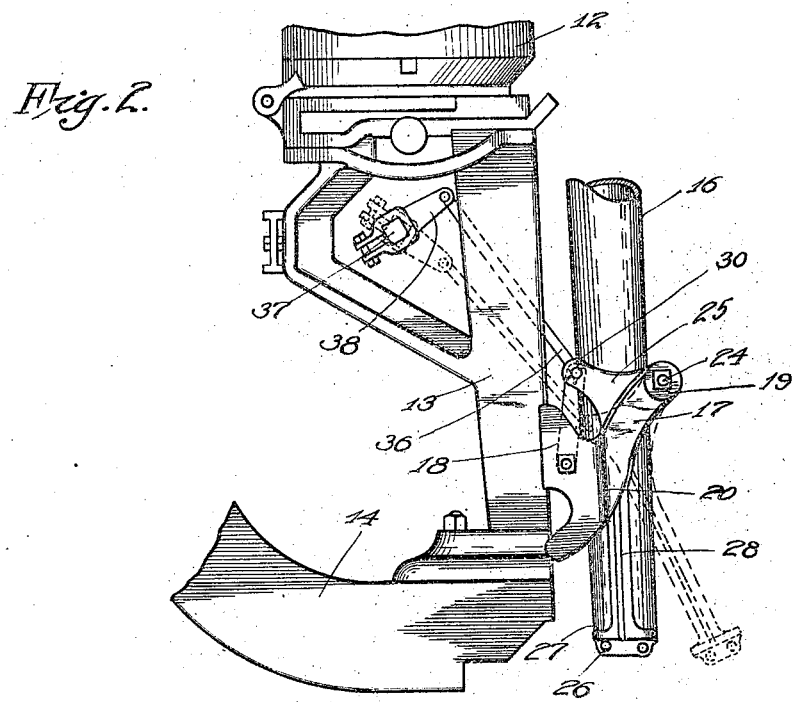
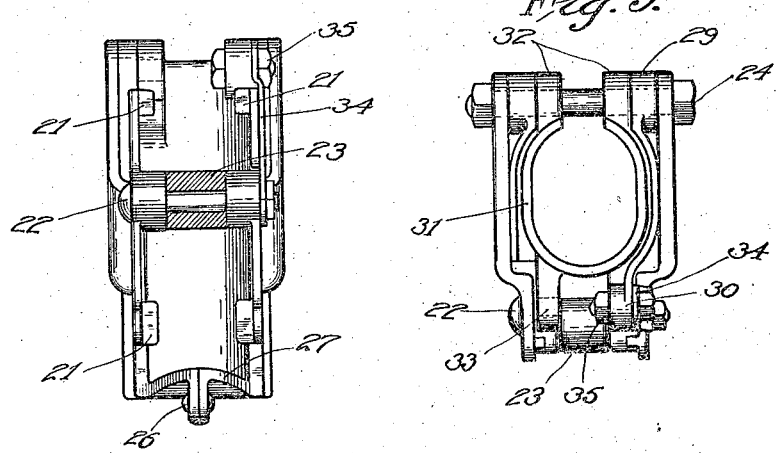
Inventor:
Ralph L. Ford,
By John P. Smith
Atty.

Patented July 22, 1924.

1,501,944

UNITED STATES PATENT OFFICE.

RALPH L. FORD, OF CHICAGO, ILLINOIS, ASSIGNOR TO INTERNATIONAL HARVESTER COMPANY, A CORPORATION OF NEW JERSEY.

FERTILIZER ATTACHMENT FOR PLANTERS.

Application filed December 19, 1919. Serial No. 346,182.

*To all whom it may concern:*

Be it known that I, RALPH L. FORD, a citizen of the United States, residing at Chicago, in the county of Cook and State of Illinois, have invented certain new and useful Improvements in Fertilizer Attachments for Planters, of which the following is a full, clear, and exact specification.

My invention relates to fertilizer attachments for planters and is an improvement on the construction for which I have obtained Patent No. 1,211,836, dated Jan. 9, 1917. It has been found desirable in practice that the distance of the fertilizer from seed planted in hills, such as corn, be varied according to the character of the soil and the quantity of fertilizer used, and the object of my invention is to provide a fertilizer discharging device that permits the distance between the fertilizer and the hill to be changed. This I have accomplished by providing a novel form of discharge device in which either the discharge spout or a closure element or valve which engages the outer end of the spout may be arranged to swing back simultaneously with the actuation of the seed valves, and by the same actuating device, and in which swinging back of the closure element causes the deposit of fertilizer close to the hill; whereas, when the spout is made to swing the fertilizer is deposited at some distance from the hill.

With these main and other incidental objects in view, my invention consists of the organization, details of construction, parts, or their equivalents, hereinafter described and more particularly defined in the claims.

Referring to the drawings—

Fig. 2 is a side elevation in enlarged scale of the runner and boot of the planter with my invention attached thereto and showing the closure element swung back in dotted lines;

Fig. 4 is a front elevation of my fertilizer discharging device; and

Fig. 5 is a plan view of the same.

Figure 1:
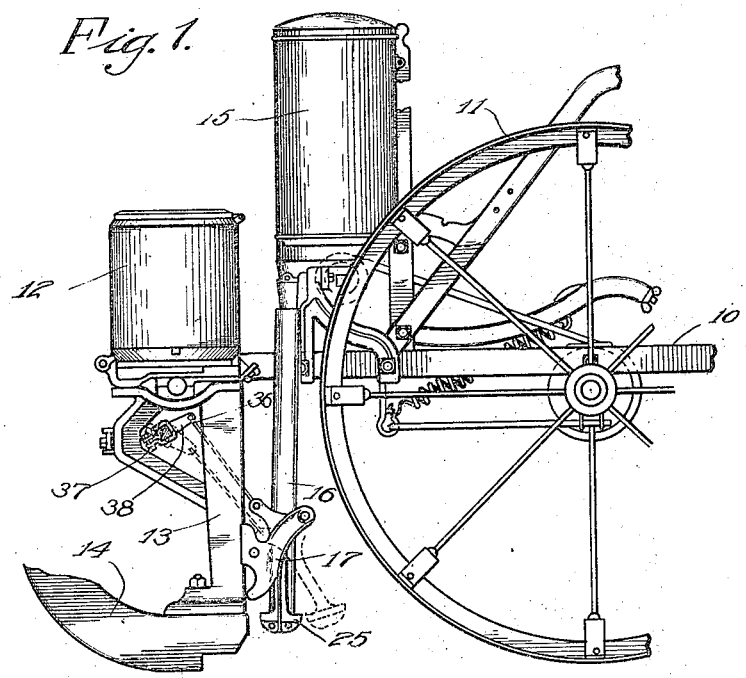
Fig. 1 shows a side elevation of a portion of an ordinary two-row corn planted to which the device of my invention is applied.

For the purpose of illustration, I have shown a planter frame 10 mounted upon carrying wheels 11 and provided with seed hoppers 12, boots 13 and furrow openers 14, all of ordinary construction.

In general, the particular form of fertilizer attachment shown herein, comprises two fertilizer containers 15 and a conduit 16 for each, leading to the rear lower end of the adjacent furrow opener and communicating with the discharge device. As both fertilizer containers and discharge devices are identical in construction and operation, illustration and description of one will suffice.

The fertilizer discharging device embodying my invention, comprises support or bracket members 17, each composed of a main or body portion 18 and upwardly and rearwardly directed arms 19, which arms are preferably slightly offset outwardly from the main portion, as shown at 20. Each member has inwardly directed lugs 21, (Fig. 4) on its body portion and the bracket members are mounted on the planter boot 13 by a bolt 22 which passes through the two members and through an apertured projection 23 (Figs. 4 and 5) formed on the rear face of the boot, the lugs 21 serving to engage the boot and hold the bracket firmly in place. The arms 19 are connected at their ends by a bolt 24. Within the bracket members 17 there is mounted a closure element or valve 25 which may be formed of two similar parts, riveted or otherwise joined together at 26 to provide a stirrup-like structure with the bottom or plate 27 and arms 28, on the upper rear ends of which are formed pivot ears 29 (Fig. 5). One of the arms 28 is provided at its upper forward end with an apertured ear 30. Received within the closure member or valve 25 is the spout 31 with its outlet normally in contact with the plate 27 of the valve. At the upper rear side of the spout there is provided a pair of ears 32 (Fig. 5). The ears 29 of the valve or closure element and the ears 32 of the spout are in axial alignment, and bolt 24 passes through and loosely supports both the spout and the valve. On its upper front side the spout has an apertured ear 33 (Fig. 5) which is normally in axial alignment with the ear 30 on the valve.

Figure 3:
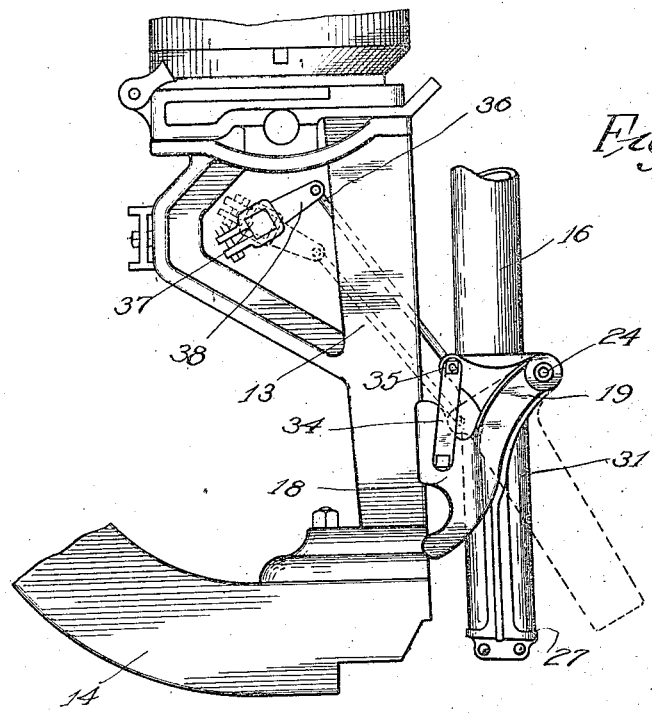
Fig. 3 is a similar view to Fig. 2, but showing the spout as swung back in dotted lines.

The structure so far described permits both the valve and spout to swing loosely on bolt 24, and in order that either one may be alternatively selected as the swinging element, I provide a locking link 34 which is shown in Figs. 3, 4 and 5, as connected to one side of the support or bracket 17 by bolt 22 and to ear 30 on the valve by a bolt 35. When so connected link 34 prevents movement of the valve, and the spout is left free to swing on pivot bolt 24. To effect the periodical swing of the boot, rod 36 is pivotally connected to ear 33 on the boot and is operatively connected to check row shaft 37 through arm 38 thereon. To make the valve the swinging element, the respective attachments or couplings of the locking link 34 and rod 36 are interchanged, that is, link 34 is connected to ear 33 on the spout and to the opposite end of bolt 22, and rod 36 is connected to the ear 30 on the valve, as illustrated in Fig. 2.

It results from the construction above described that either the valve or the spout can be made to swing backwardly at each actuation of the check row shaft, thus releasing a charge of fertilizer, and that when the spout is made the swinging element and is therefore directed rearwardly at the time of discharge the discharge of fertilizer will take place behind the valve and at some distance from the seed dropping boot; whereas, when the spout remains vertically directed and the valve swings, the fertilizer is dropped relatively close to the boot. The offsets 20 in the bracket members serve as a stop for the valve in its return swing, and the boot is stopped by contact with the lug 23 on the boot and sufficient jarring is produced by the actuation of either element to prevent lodging of the fertilizer within the spout.

While I have herein described the preferred embodiment of my invention, such variations therefrom may be made as come within the scope of the annexed claims.

What I claim as my invention is:

1. The combination of seed discharging and fertilizer discharging devices, means for causing both devices to discharge intermittently including means for varying the distance between the points at which the seed and fertilizer are discharged comprising a movably supported spout on the fertilizer discharging device, a movably supported closure for the spout, operating means therefor, means for connecting the operating means either to the spout or to the closure, and means for immovably locking the non-operating element.

2. The combination of seed discharging and fertilizer discharging devices, unitary means for intermittently actuating both devices, the fertilizer discharging device comprising a spout and valve, and selective couplings between the actuating means and the spout and valve, through which the position of the spout at time of discharge is determined.

3. A fertilizer discharging device comprising a support, a discharge spout mounted on the support, a closure for the spout also mounted on the support, the spout and closure being relatively movable, and means for causing discharge of the spout in one of a plurality of positions through relative movement between the spout and closure.

4. A fertilizer discharging device, comprising a support, a discharge spout mounted on the support, a closure for the spout also mounted on the support, means whereby the direction of the spout at time of discharge may be changed, and actuating means for causing separation of the spout and closure irrespective of the direction of discharge of the spout.

5. A fertilizer discharge device comprising a support, a discharge spout pivoted on the support, a closure pivoted on the support and engaging the outlet of the spout, aligned ears on the spout and closure respectively, a locking link connecting one of said ears with the support, and an actuating rod connected to the other ear the locking link and actuating rod being adapted to be interchangeably connected to the respective ears.

In testimony whereof I affix my signature.

RALPH L. FORD.